US006296240B1

(12) United States Patent
Nakai et al.

(10) Patent No.: US 6,296,240 B1
(45) Date of Patent: Oct. 2, 2001

(54) CONNECTOR HOLDER

(75) Inventors: Masaki Nakai; Yukio Shimomura; Hiroshi Kawamura, all of Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/210,818

(22) Filed: Dec. 15, 1998

(30) Foreign Application Priority Data

Dec. 16, 1997 (JP) ..................................................... 9-346606
Jul. 15, 1998 (JP) ................................................... 10-200772

(51) Int. Cl.[7] ....................................................... B23G 1/00
(52) U.S. Cl. ..................... 269/47; 269/903; 269/254 CS; 269/303; 269/310; 269/66
(58) Field of Search ............................. 269/47, 303–305, 269/315, 316, 317, 309, 310, 903, 266, 254 R, 254 CS, 40, 43, 54.5; 324/158 F; 140/92.1; 29/755, 850, 760

(56) References Cited

U.S. PATENT DOCUMENTS 4,337,934 * 7/1982 Caveney ............................... 269/903
5,338,014 * 8/1994 Kitamura ............................... 269/47
5,401,010 * 3/1995 Haswell et al. ...................... 269/903
5,490,664 * 2/1996 Justus et al. ........................... 269/66
5,581,873 * 12/1996 Okura et al. ......................... 269/903
5,630,273 * 5/1997 Kobayashit et al. ................. 269/903
6,003,852 * 12/1999 Kawamura ........................... 269/903

FOREIGN PATENT DOCUMENTS

625785 * 11/1994 (EP) ....................................... 269/47
720180 7/1996 (EP) .
7326236 12/1995 (JP) .
9-129351 5/1997 (JP) .
10106368 4/1998 (JP) .
10144157 5/1998 (JP) .

OTHER PUBLICATIONS

Patent Abstract of Japan, vol. 097, No. 009, published Sep. 30, 1997.
Patent Abstract of Japan, vol. 096, No. 004, published Apr. 30, 1996.
A Japanese Language abstract of JP 10–106368.
A Japanese Language abstract of JP 10–144157.

* cited by examiner

*Primary Examiner*—Joseph J. Hail, III
*Assistant Examiner*—Daniel Shanley
(74) *Attorney, Agent, or Firm*—Greenblum & Bernstein, P.L.C.

(57) ABSTRACT

The present invention is directed to a connector holder for holding a connector during wiring of the connector which facilitates accurate positioning of protection material about wires of a cable. The connector holder includes a support member such as a pillar for mounting the invention to the wiring board. The connector holder includes a holder portion which houses a connector in an insertable and removable manner in such a condition that the wires can be connected thereto, and a positioning member is integrally provided with the holder portion and assists in the positioning of protection material about cable wires connected to the connector. The positioning member may also include an adjustable pin capable of positioning protection material arranged around the periphery of a cable in such a condition that the plurality of wires of the cable connected with a connector is arranged on both sides of the positioning member. Additionally, the holder portion may adjustably hold a connector between a connector-regulating member and a resilient member, which resiliently presses the connector against the connector-regulating member. The present invention may further provide for the adjustment of the thickness of the connector regulating member.

22 Claims, 10 Drawing Sheets

CONNECTOR HOLDER

BACKGROUND OF THE INVENTION

1. Field of the Invention

The present invention relates to a connector holder, and more particularly, to a connector holder for use in the process of assembling a wiring harness, and a subassembly (hereinafter generally referred to as a "wire assembly").

2. Description of Background Information

In general, a wire assembly consists of a circuit having a cable constructed of a plurality of wires, several connectors connected to the wires, the wires surrounded by protection material such as flexible tubes, corrugated tubes, and the like. Normally, the wire assembly is arranged in a tree configuration containing a trunk line and branch wires branching from the trunk line, wherein a terminal connector is connected to a respective branch wire. In such a wire assembly manufacturing process, several connector holders are vertically mounted on a work bench, called a wiring board, then the wires are arranged on the wiring board in a predetermined configuration by connecting a wire with a respective connector mounted on the connector holder. Protection material such as flexible tubing is then mounted onto a predetermined area about the wires of the cable and fastened to the cable by means of taping or the like.

Recently, the dimensional accuracy required for the construction of wire assemblies has become extremely high. High dimensional accuracy is also required for areas of wires contacting connectors, as well as for the mounting position of the protection materials with respect to the wires (particularly, the distance between the termination of the protection material and the connector).

However, protection materials are usually visually and manually installed, i.e., the installer positions the material solely by intuition, which causes variations that result in positioning error, thereby making it difficult to meet the recently-required positioning accuracy of wire assemblies.

The present invention solves the above problems, and the subject of the present invention is to provide a connector holder capable of increasing the positioning accuracy of protection material when manufacturing wire assemblies.

SUMMARY OF THE INVENTION

The present invention provides a connector holder for use in conjunction with a wiring board when assembling wire assemblies. The wiring board has at least one cable to be connected with a connector, each cable comprising one or more wires. The wiring board additionally has protection material such as flexible tubing for arrangement about the wires of the cable, and a support member such as a pillar is provided for mounting the invention to the wiring board. The invention includes a holder portion which houses a connector in an insertable and removable manner in such a condition that the wires can be connected thereto, and a positioning member which is integrally provided with the holder portion and assists in the positioning of protection material about cable wires connected to the connector.

In the present invention, a connector to be connected with cable wires is positioned by insertion into the holder portion. Additionally, the present invention enables protection material to be accurately positioned about the cable at a predetermined distance from the positioned connector.

According to one aspect of the invention, that the positioning member may be adjustably fastened to the holder portion and is changeable according to the direction of the cable wire connected with the connector. The vertical mounting of the connector holder of the present invention to a wiring board more easily facilitates the manufacture of the connector holder and wire assembly, because the positioning member allows change in accordance with the direction onto which a wire connected with the connector is arranged. It is thus easier to use the connector holder of the present invention for a wide variety of wire assembly tasks.

In another aspect of the invention, the positioning member may be a pin capable of positioning protection material arranged around the periphery of a cable in such a condition that at least two wires of the cable connected with a connector is arranged on both sides of the positioning member. Since the wires are arranged on both sides of the pin, protection materials may be more easily and accurately positioned on the cable, even when the protection material is constructed of soft material. Additionally, interference between the cable wires connected with the connector and the pin is more readily avoided, thereby reducing the possibility of wiring failures.

In an additional aspect of the invention, the holder portion may hold a connector with a connector-regulating member which positions the side of a connector where the cable is to be inserted therein, so that the cable connected with the connector is disengageable. According to further aspects of the invention, a resilient member, such as a regulating tool, which resiliently presses the connector against the connector-regulating member may be provided, and may further include a base portion which is integrally provided with the connector-regulating member and holds the lower surface of the connector to be mounted.

In other aspects of the present invention, the side of a connector where the cable is to be inserted may be positioned by a connector regulating member. The connector may be pressed against the connector regulating member by a resilient member so that the lower surface of connector is further retained by a base portion. The connector may also be detached from the holder so that the connector is wholly disengaged therefrom. In addition, the resilient member may have an aperture for providing the adjustment of the distance between the pressing area of the resilient member and the connector-regulating member, thereby allowing the invention to accommodate connectors of varying size.

In a further aspect of the invention, the above-mentioned positioning member and a holder may be configured in such a manner that the interval between the front-end face and the back face (referred to as "protection material regulating dimension") of the positioning member is relatively adjustable, thereby providing the invention with increased flexibility and versatility when mounting protection material.

DETAILED DESCRIPTION OF THE PREFERRED EMBODIMENTS

Figure 1:
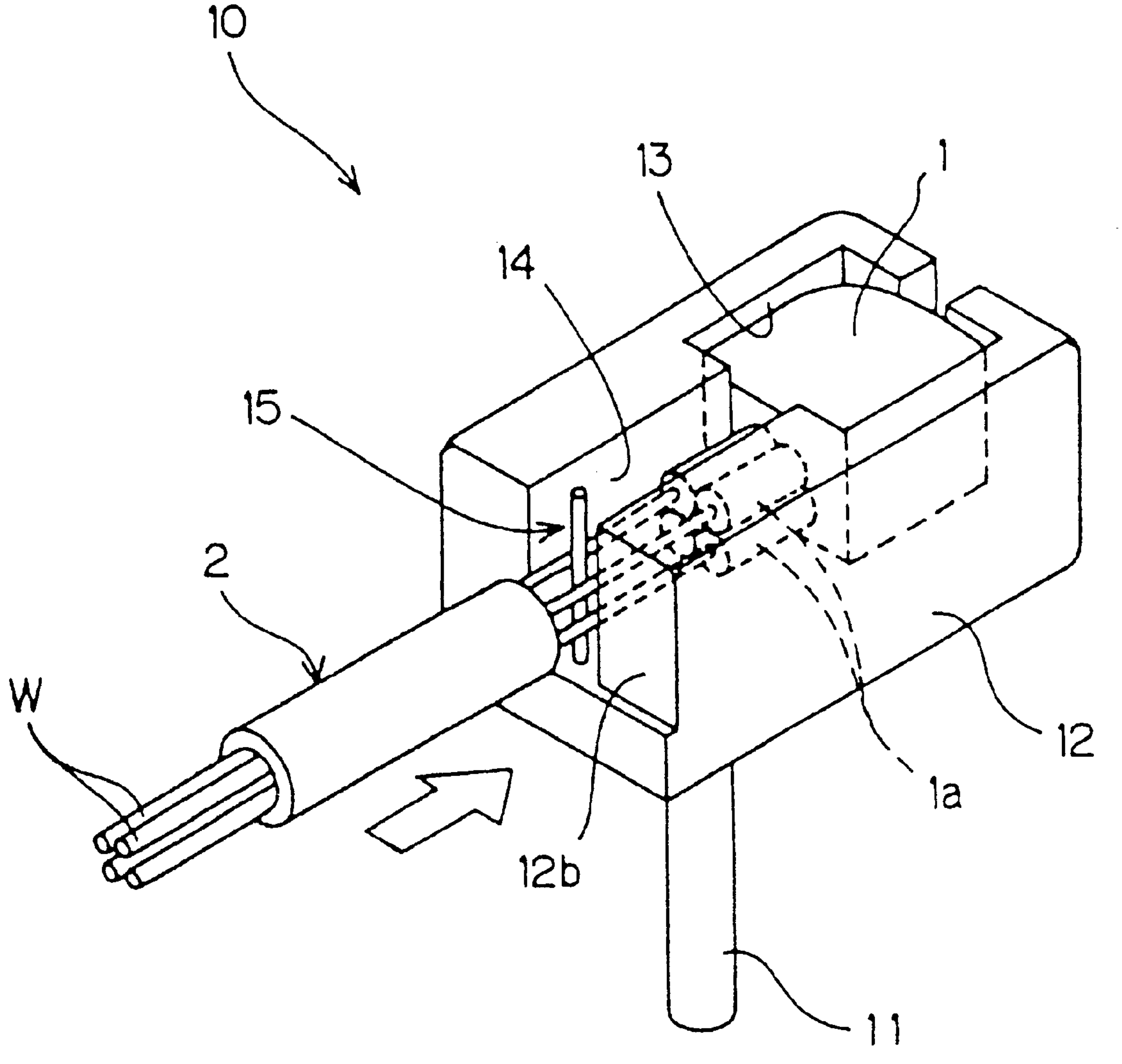
FIG. 1 depicts a perspective view of a connector holder according to a first embodiment of the present invention, shown being used in conjunction with a wire assembly, and with certain details of the wire assembly shown in broken lines.
Figure 2:
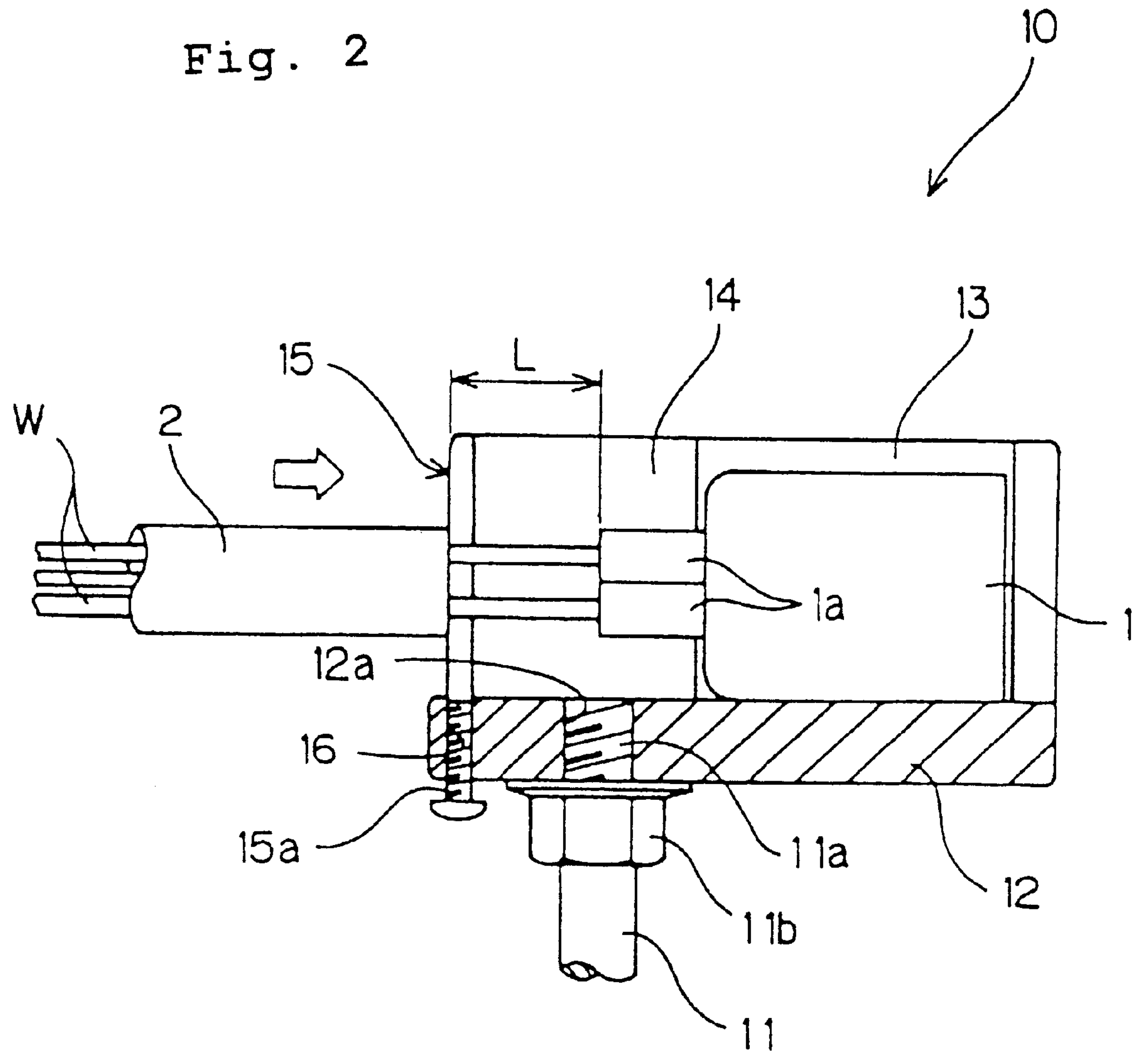
FIG. 2 depicts a sectional partial schematic view of the connector holder of FIG. 1 shown being used in conjunction with a wire assembly.
Figure 3:
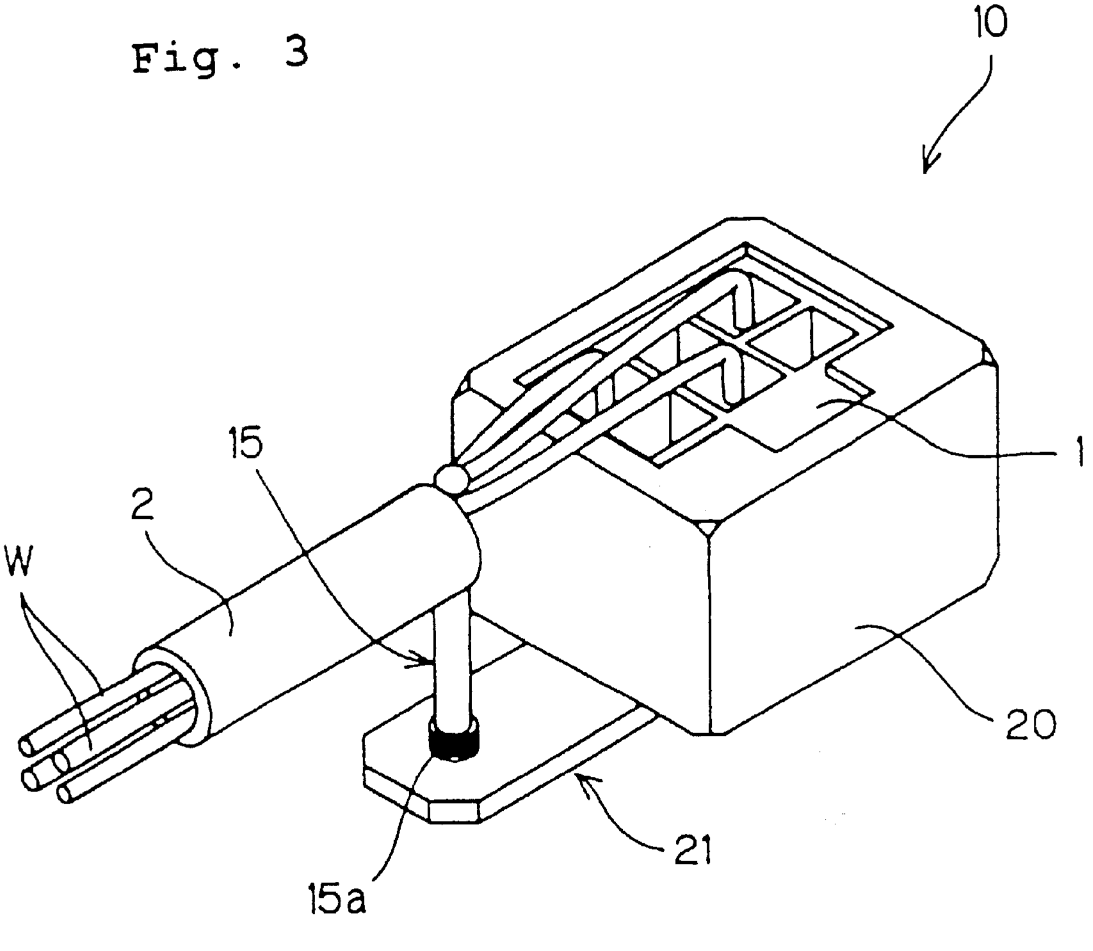
FIG. 3 depicts a perspective view of the connector holder according to a second embodiment of the present invention, shown being used in conjunction with a wire assembly.

Referring to the drawings wherein like numerals represent like elements, FIG. 1 shows a perspective view of a connector holder 10 according to a first embodiment of the present invention, and FIG. 2 shows a partial sectional schematic view of the connector holder 10 in FIG. 1.

As shown in FIG. 1, the connector holder 10 in this embodiment has a support member such as a pillar 11 provided in a wiring board (not illustrated herein), and a holder portion 12 formed on the upper side of the pillar 11. The pillar 11 is ideally a metallic round-bar member, although it may be formed of other materials in alternative embodiments. The pillar 11 is fastened to the wiring board by known means (for instance, by screw thread or the like).

The holder portion 12 has a box configuration and is preferably formed of a resin. At the bottom of the holder portion 12*a* screw hole 12*a* is provided for engaging with a screw thread 11*a* provided on the upper end area of the pillar 11. The holder portion 12 is secured to the pillar 11 by fastening the bottom face of the holder portion 12 by a nut lib engaged with the screw thread 11*a*.

The holder portion 12 is provided with a housing recessed area 13 which is sectioned for housing a connector 1. The housing recessed area 13 is set so that a predetermined specific connector 1 having an irregular form (as seen in FIG. 1) and dimension may be inserted and extracted in a downward or upward direction only. As illustrated in FIG. 1, the connector 1 is inserted into the housing recessed area 13 so that the side of the connector that is to be connected to the cable can be oriented towards a slit 14 which allows insertion/extraction of cable W integrally with the connector 1. Additionally, the slit 14 is in open communication with the housing recessed area 13.

The connector 1 shown is of the water-proof type, and a boss 1a which houses a rubber cap (not illustrated herein) adhered to a cable W is provided. The boss 1a is housed in the housing recessed area 13 and is embedded in the above-mentioned slit 14 and then held by a holder portion 12. It will be readily appreciated by those skilled in the art that a standard, non-waterproof type of connector 1 may also be used in with the present invention 10.

A positioning member such as a pin 15 is provided inside the slit 14, the pin 15 serving to assist in the positioning of protection material on a cable W which is in turn connected with a connector 1. As shown in FIG. 1., the edge face of the protection material 2 is fastened at the opening area of the slit 14, thereby positioning the protection material when taping the material to the cable W.

In order to mount the pin 15, a pin screw hole 16 is provided at the bottom of the opening area of slit 14 in the example as shown here, and is engaged with a larger diameter screw 15*a* provided at the end of pin 15. Therefore, with the example as shown in FIGS. 1 and 2, the height may be made adjustable according to the dimension of the connector.

By fastening the holder portion 12 to a pillar 11 vertically mounted on the wiring board, accurate positioning of the connector 1 is attained by mounting the connector 1 on this holder portion 12. With a pin 15 integrally fastened (vertically mounted) to the holder portion 12, accurate positioning of the protection material 2 on the cable W can be made at a normal position spaced apart from the positioned connector 1 by a predetermined dimension (protection material regulated dimension) L, as shown in FIG. 2.

Additionally, the pin 15 allows arrangement of the cable W on both sides thereof. The protection material 2 may be accurately positioned even if the protection material 2 is constructed of soft material. Interference between the cable W connected with the connector 1 and the pin 15 is eliminated, therefore reducing the possibility of failure in wiring work.

FIGS. 3–6 show a connector holder 210 according to a second preferred embodiment of the present invention. The holder portion 20 holds a connector 1 in such a condition that the side of the connector 1 that is to be connected to the cable is positioned upright, and is devoid of a slit which is formed on the holder portion 12 of the first preferred embodiment. A pin 15 is vertically mounted by first providing a mounting plate 21 between a holder portion 20 and a pillar 11 in a cantilever-type manner, and engaging a screw thread 15*a* of a pin 15 with a screw hole 21*a* provided near the distal end of the mounting plate 21.

Figure 4:
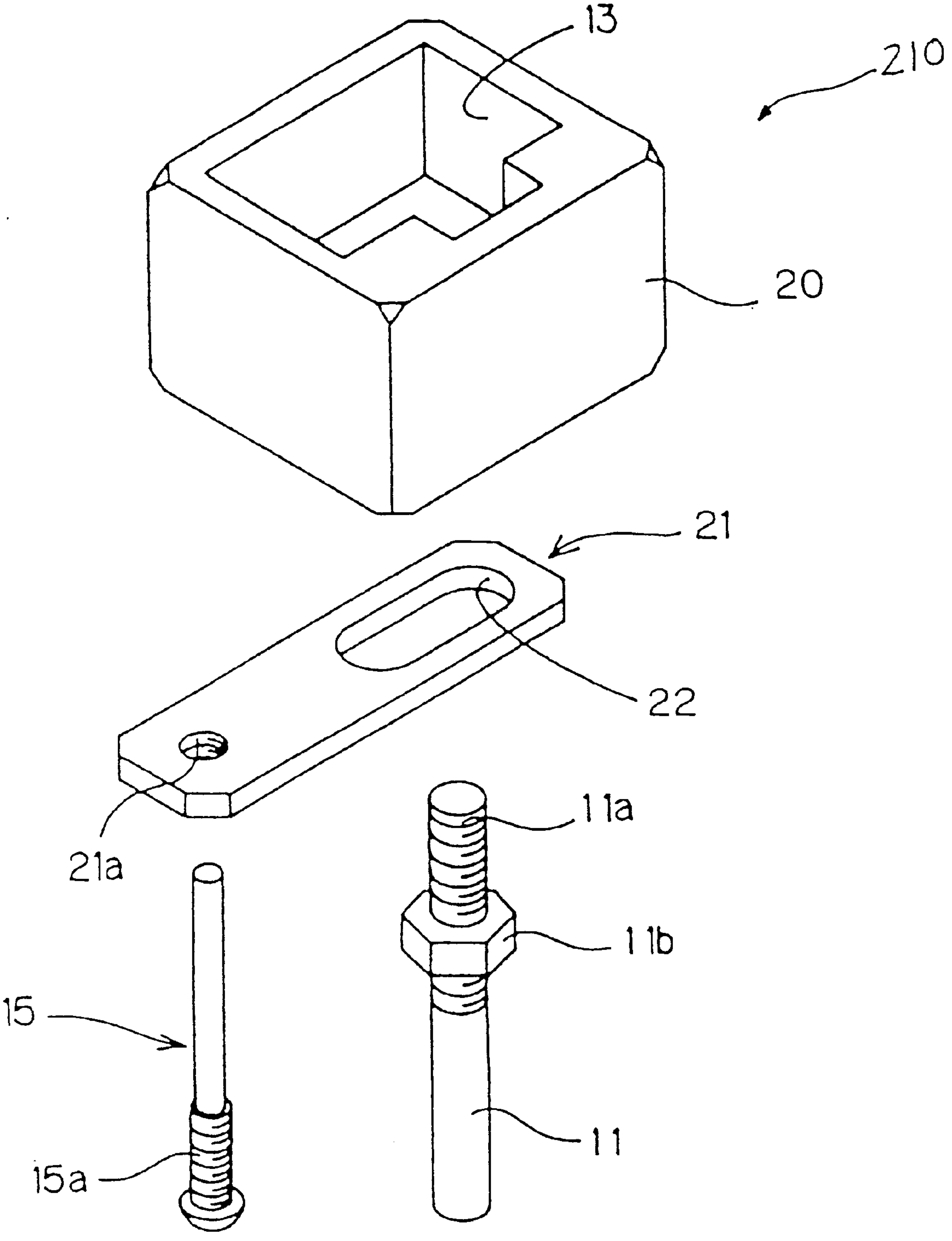
FIG. 4 depicts an exploded perspective view of the connector holder of FIG. 3.
Figure 5:
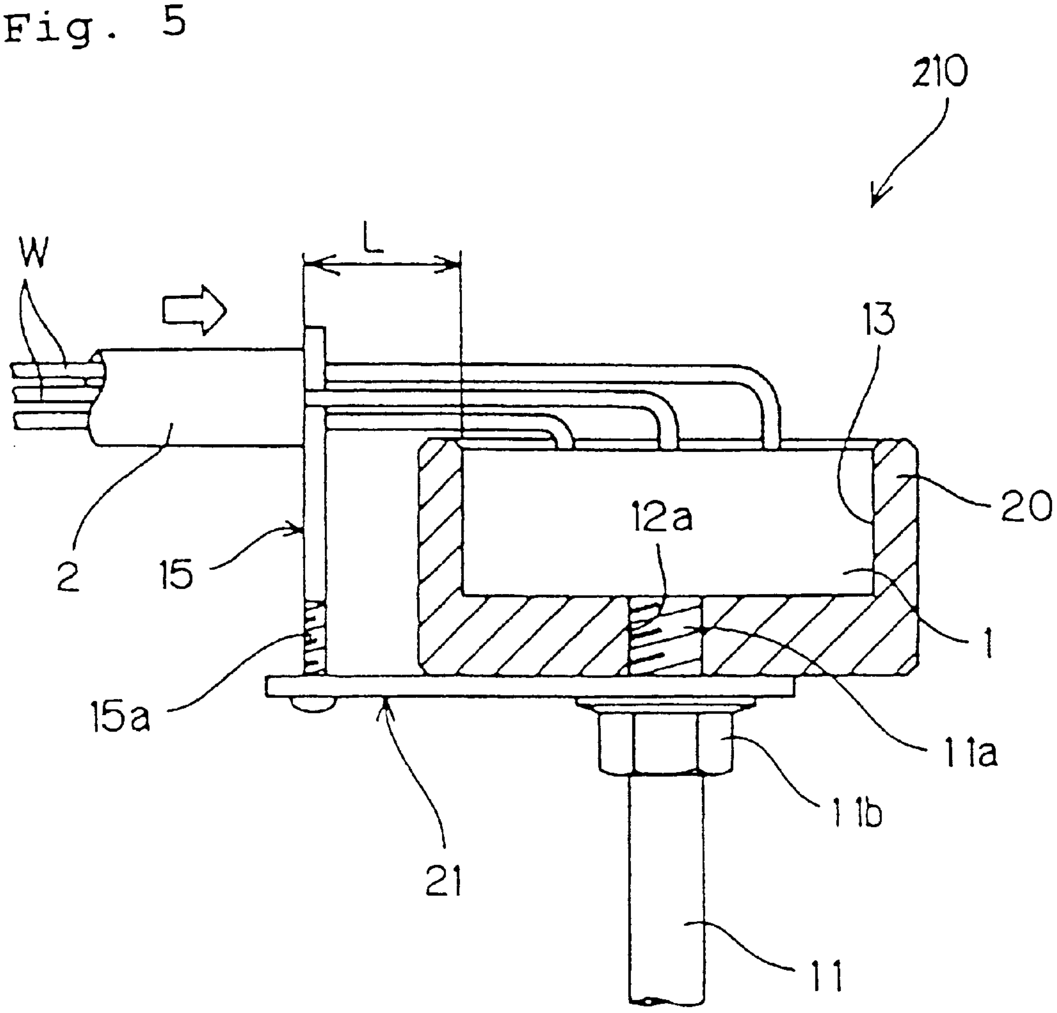
FIG. 5 depicts a partial sectional side schematic view of the connector holder in FIG. 3, shown being used in conjunction with a wire assembly.

As shown in FIG. 4, the proximal end of the mounting plate 21 has a section for a flat oval hole 22 which permits penetration of a screw thread 11a that is located on the upper end of the pillar 11. The pillar 11 is fastened to the holder portion 20 in such a manner that the distance between the holder portion 20 and the pin 15 may be adjusted by screwing the nut lib over the screw thread 11*a* which is then inserted into the flat oval hole 22 when fastening the holder portion 20 onto the pillar by engaging the holder portion 20 with the screw thread 11*a*.

Figure 6:
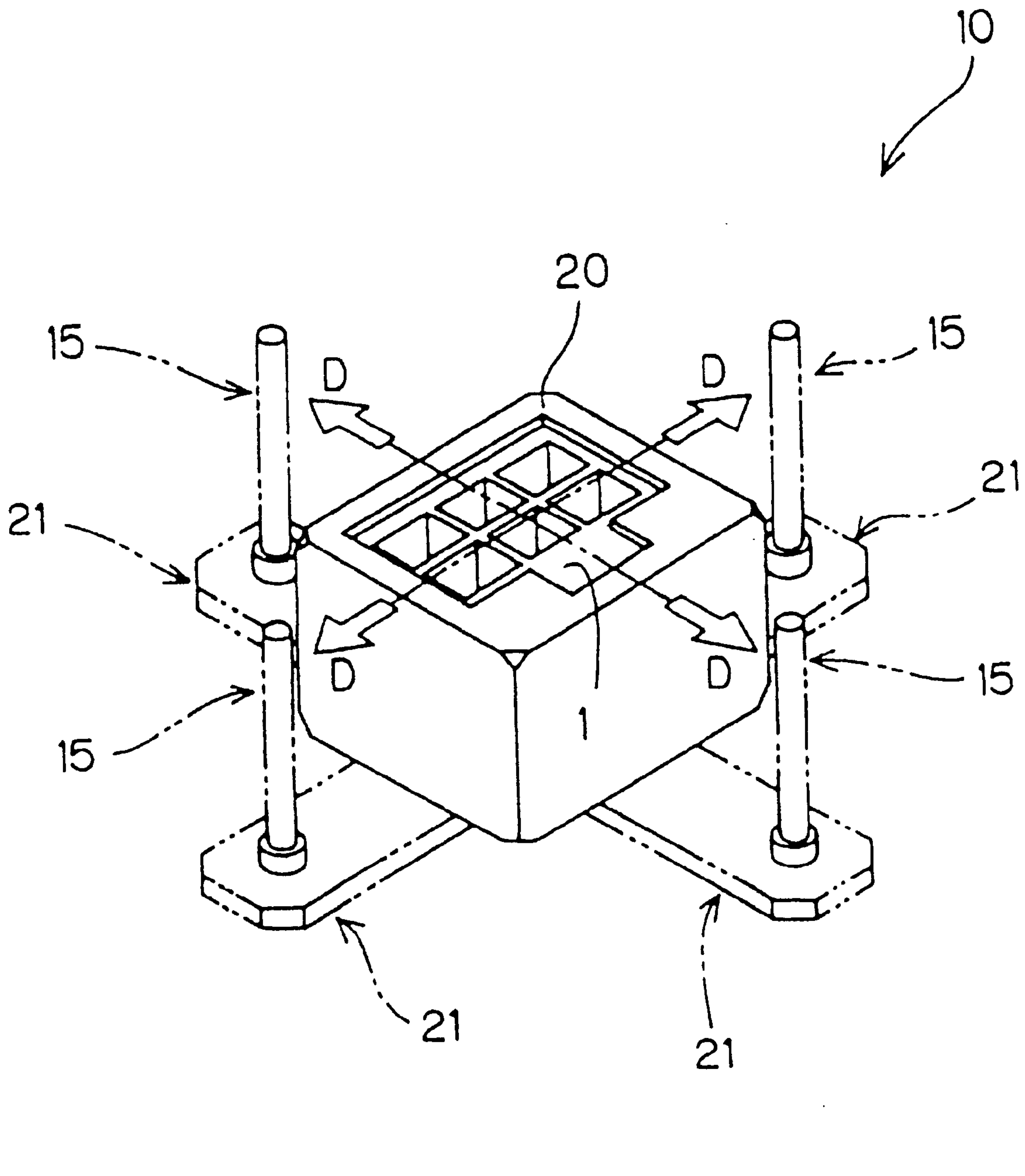
FIG. 6 depicts a perspective view of the connector holder relating to the embodiment of FIG. 3, showing the varied positions of the pin.

FIG. 6 shows the variable mounting positions of the mounting plate 21 of the second embodiment. Because the position of the pin 15 may be changed in relation to the longitudinal axis of the pillar 11, the position of the pin 15 allows changes in accordance with a direction D of a cable W. In FIG. 6, four directions D are shown along each of an outer side of the four-sided connector 1. Therefore, the connector holder 210 may be mounted to a wiring board without any restrictions as to the mounting position and the type of wire assembly to be assembled, which makes the present invention extremely versatile.

In the first two embodiments 10, 210 respectively mentioned above, the pin 15 allows the protection material 2 to be positioned from the connector 1 by a precise protection material-regulated dimension L. Dimensional accuracy is therefore increased when mounting protection material 2 to a cable W during manufacture of a wire assembly.

Both of the above-described embodiments of the present invention show only preferred embodiments. Therefore the present invention as mentioned above is not limited to the scope of the above-described preferred embodiments. For example, the pin 15 may be omitted in the example shown in FIG. 1, which permits positioning of a protection material 2 by an open-ended portion 12*b* of slit 14. However, it is preferable to use a pin 15, since accurate positioning of protection material 2 may still be accomplished even when the protection material 2 is made of soft material such as vinyl resin.

Figure 7:
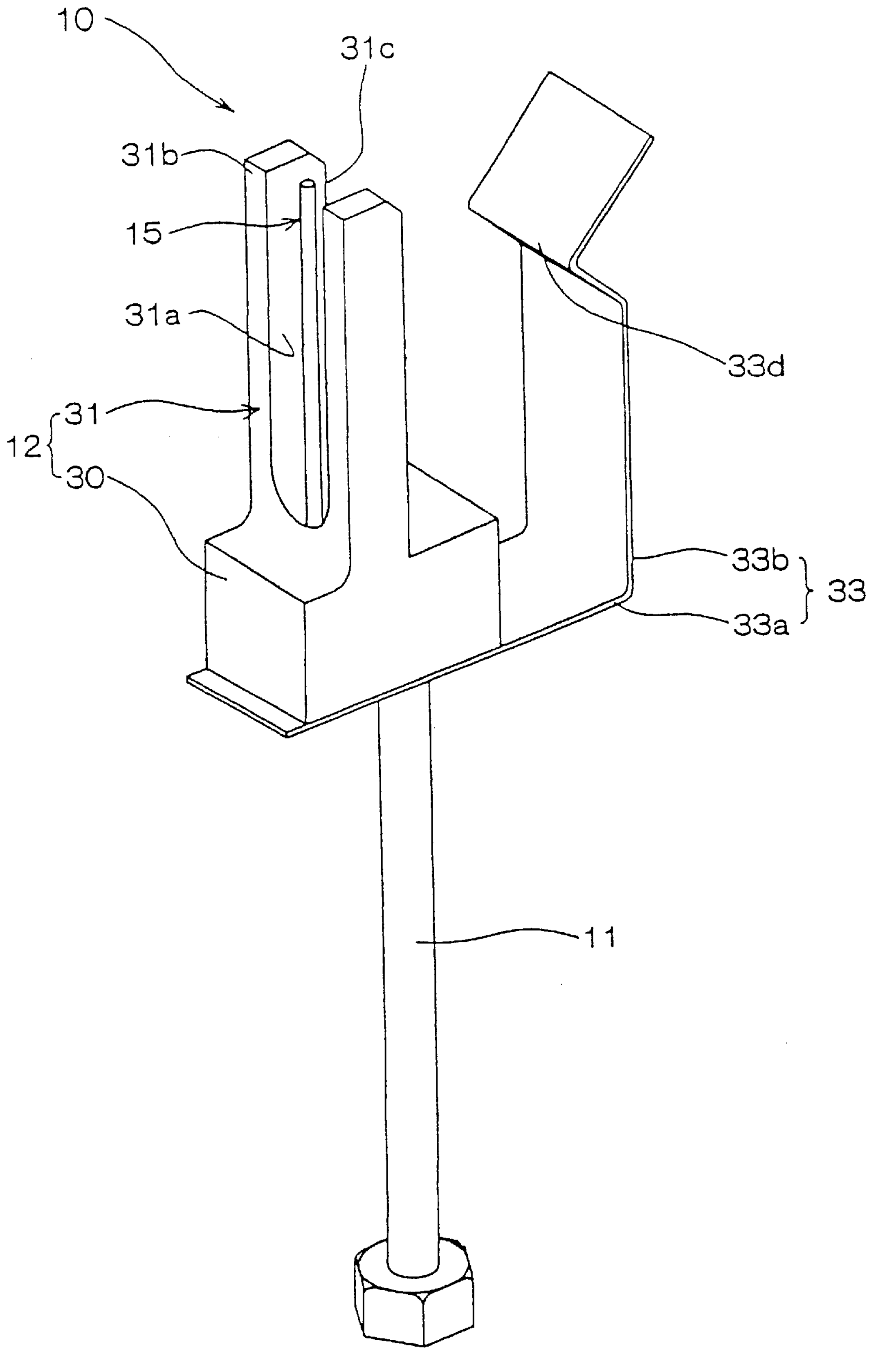
FIG. 7 depicts a perspective view of a connector holder relating to a third embodiment of the present invention.
Figure 8:
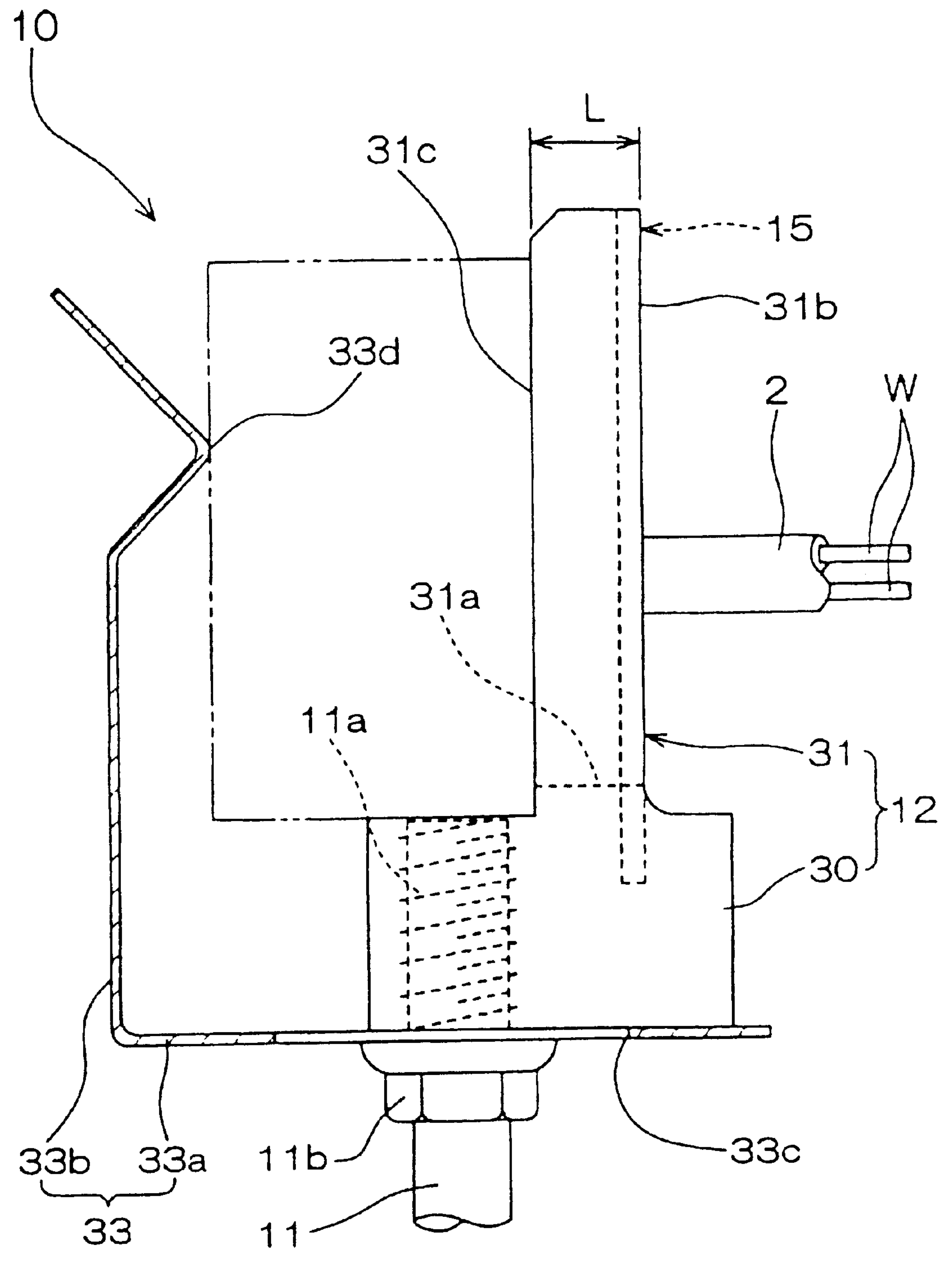
FIG. 8 depicts a side schematic view showing the major part of the connector holder in FIG. 7, showing certain internal details in phantom lines.

Referring to FIGS. 7 and 8, a third embodiment of the connector holder 310 is shown, FIG. 7 representing a perspective view and FIG. 8 representing a side schematic view. The third embodiment includes a holder portion 12 having a resin mold that is integrally provided with a base portion 30, a connector regulating member in the form of a "U"-shaped wall portion 31 which is vertically mounted on the base portion, and an "L"-shaped regulating portion 38. The base portion 30 has a substantially cuboidal form, and a pin 15 is provided on the upper area of the base portion, at the base of the "U"-shaped wall portion.

The "U"-shaped wall portion 31 regulates a side 1*b* of a connector 1 where the cable is to be inserted 1*b*. The "U"-shaped wall portion 31 has an insertion recessed portion 31*a* generally having a U-shape which forms the bilateral symmetry of the "U"- shaped wall portion 31, the wall portion 31 having the pin 15 as its symmetrical axis. Front end-face 31*b* of the wall portion 31 is flush with edge of the pin 15, shown in FIG. 8. Furthermore, back face 31*c* of the "U"-shaped wall portion 31 makes contact with the side of the connector 1 where the cable is to be inserted. As illustrated in FIG. 8, the interval between the front end-face 31*b* and a back face 31*c* determines a protection material regulating dimension L.

The regulating tool 33 is an integrally-formed generally "L"-shaped resin mold and includes a generally planar mounting portion 33*a* and a pressing portion 33*b*. A base portion 30 is secured to the mounting portion 33*a* by a nut 11*b* of a pillar 11, and has a front end-face 31*b* , a back face 31*c*, and a generally "U"- shaped wall portion 31 which extends upward from a longitudinal back end-portion of the mounting portion 33*a*. While the regulating tool 33 is ideally constructed of resin, it may be constructed of other materials such as metal in alternative embodiments.

The pressing portion 33*b* has a generally "<"-shaped bent portion 33*d* at the middle area thereof, and the bent portion 33*d* protrudes towards the "U"-shaped wall portion 31. When pressing the connector 1, this bent portion 33*d* may be dimensionally configured so as to press the bent portion 33*d* against the connector 1, and the connector may be below the bent portion 33*d*, as discussed in the fourth embodiment below and shown in FIG. 10.

The regulating tool 33 secures the connector 1 in cooperation with the "U"- shaped wall portion 31 by resiliently urging the connector 1 towards the back-face 31*c* of the "U"-shaped wall portion 31 by the spring-function of the pressing portion 33*b*. The base portion 30, the "U"-shaped wall portion 31, and the regulating tool 33 enable complete detachment of the connector 1 from the holder portion 12. Therefore, this embodiment 310 facilitates easy detaching of the connector 1, reducing the possibility of wiring failures between the connector 1 and the cable W.

As shown in FIG. 8, an oval flat hole 33*c* is present along the longitudinal direction on the mounting portion 33*a* of the regulating tool 33. The pillar 11 penetrates the oval flat hole 33*c* and is threadedly inserted into the base portion 30, which is integrally formed with the "U"-shaped wall portion 31 and the pin 15. The oval flat hole 33*c* provides for the sliding adjustment of the pressing portion 33*b* of the regulating tool 33, which can either increase or decrease the distance between the pressing portion 33*b* of the regulating tool 33, thereby enabling the present invention to a accommodate connectors 1 of varying size.

Figure 9:
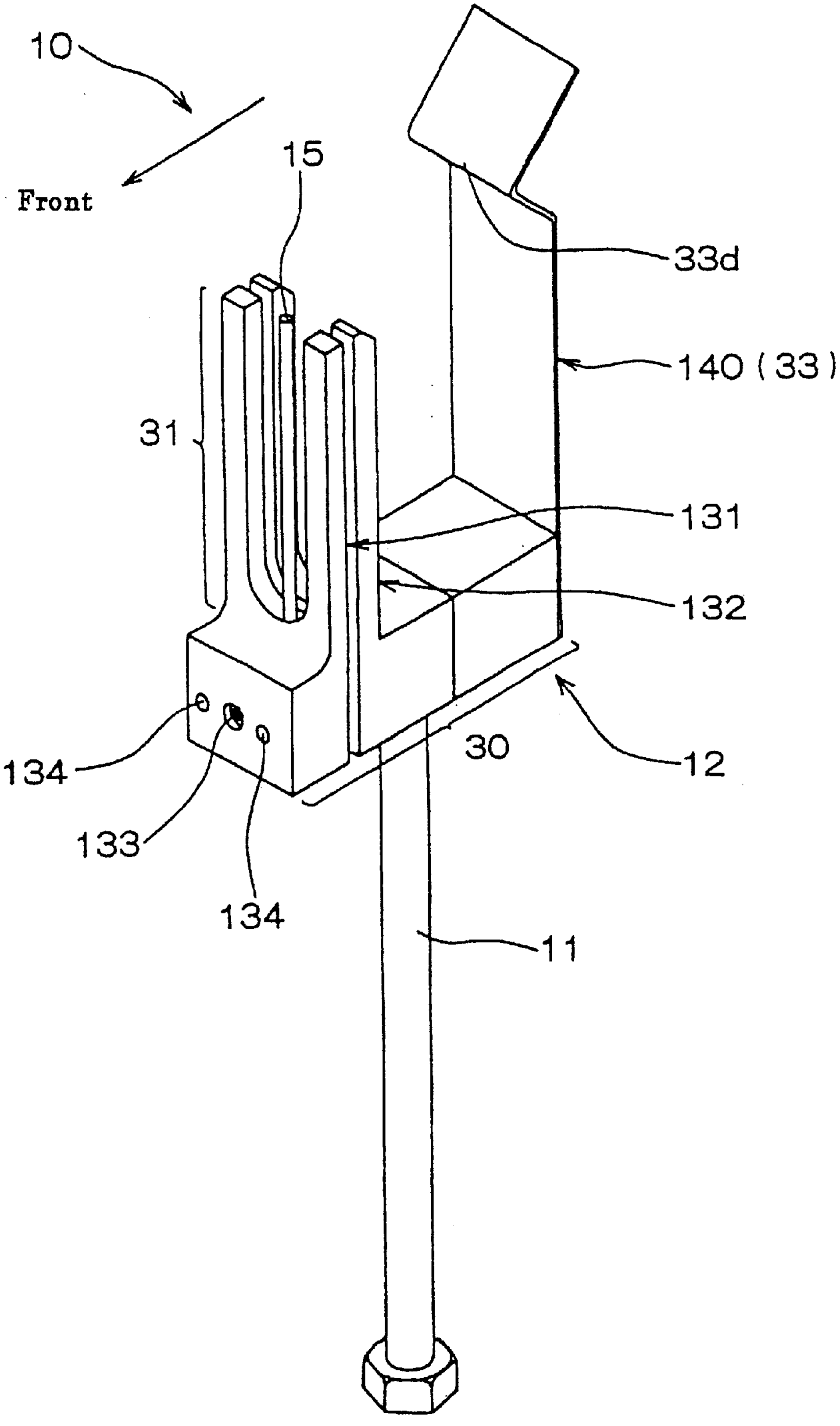
FIG. 9 depicts a perspective view of the connector holder relating to fourth embodiment of the present invention.
Figure 10:
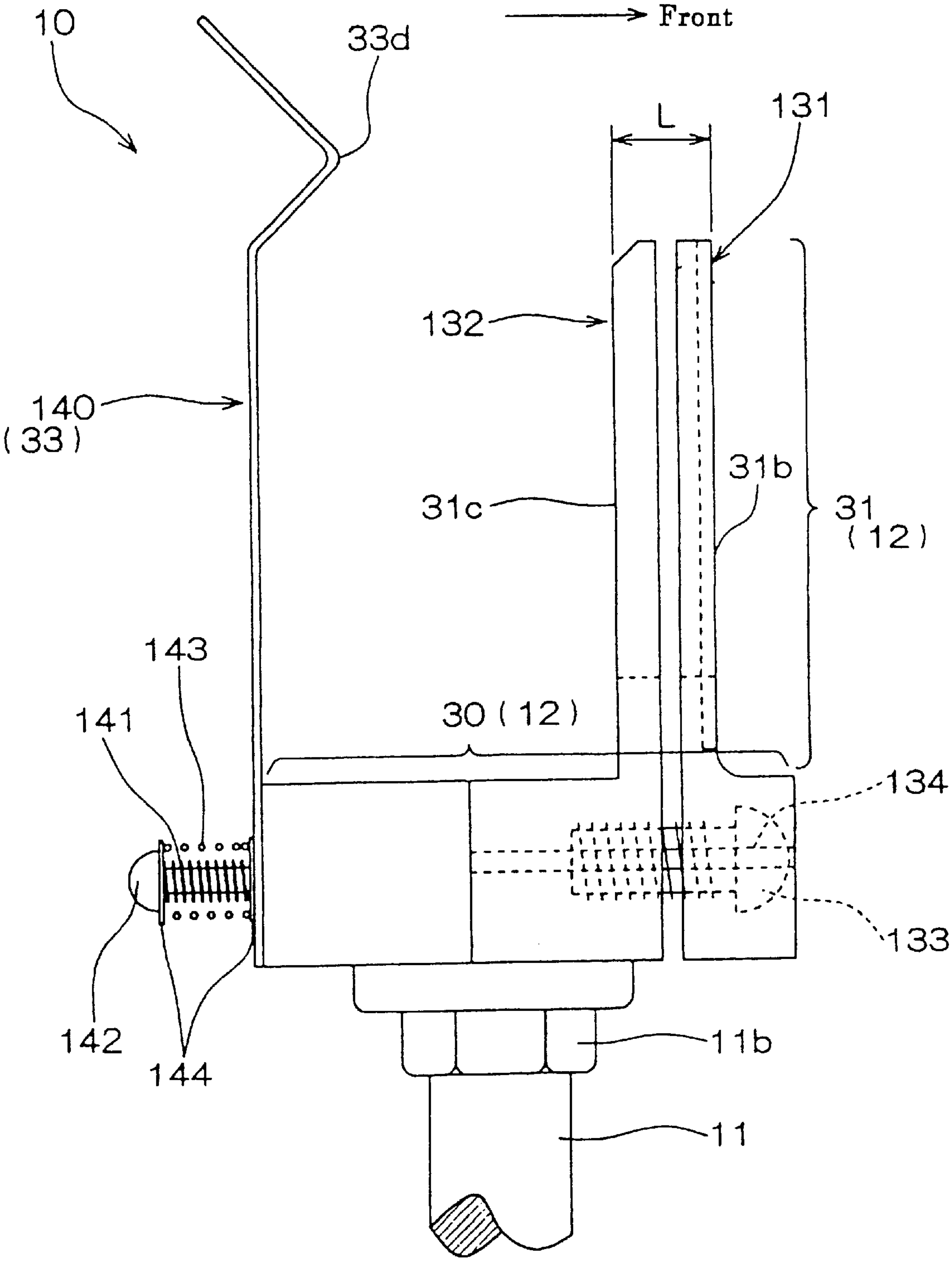
FIG. 10 depicts a side schematic view showing the major area of the connector holder in FIG. 9, showing certain internal details in phantom lines.

FIGS. 9 and 10 represent a fourth preferred embodiment of the present invention, FIG. 9 showing a perspective view showing the connector holder 410, and FIG. 10 showing a side schematic view. The holder portion 12 of the fourth embodiment 410 is split along the length of the "U"-shaped wall 31, to create a front portion 131 and a back portion 132, the front portion having a front end face 31*b* and the back portion having a back face 31*c*. The front portion 131 and the rear portion are held together by a connecting screw 133, and a pair of guide bars 134 located on either side of the screw prevent axial displacement of the front portion. The front end face 31*b* and the back face 31*c* define a protection material regulating dimension L, shown in FIG. 10. The protection material regulating dimension L may be increased or decreased by turning the connecting screw 133.

The guide bars 134 are fastened to the front portion 131, and slidingly penetrate the back portion 132. Although not shown, an anti-slip mechanism for each guide bar 134 is provided on the back portion 132. Each guide bar 134 is configured to slidingly withdraw from the back portion 132 within a predetermined range regulated by the anti-slip mechanism. In addition, the connecting screw 133 is threadedly engaged with the back portion 132, and rotates freely within the front portion 131. A retaining member 135 is fixed to the screw 133 and is rotatable therewith. The retaining member 135 may be formed as a washer, or any suitable element, fixed to the screw 133 such that rotation of the screw 133 in one direction causes the front portion 131 to move toward the back portion 132, and rotation in the opposite direction causes the front portion 131 to move away from the back portion. Thus, by rotating the connecting screw 133, the distance between both portions 131 and 132 may be changed, thereby allowing for adjustment of the protection material regulating dimension L.

In the fourth embodiment 410, a plate spring 140 having a top and a bottom end is adopted as a regulating tool, and the bottom end thereof is fastened to the base portion 30 by a pair of plate screws 141, only one of which is shown in FIG. 10. A head portion 142 of each plate screw 141 is set apart in an axial direction against the plate spring 140. A coil spring 143 having opposed ends is axially arranged about the periphery of the small screw 141, with washers 144 on both ends of the coil spring functioning as a spring sheet. The force of the plate spring 140 can be adjusted by turning the plate screws 141 each have a coil spring 143, thereby making it easier to select the force applied to a connector 1 by the plate spring 140.

It is to be understood that the present invention is not limited to the embodiments described above, but encompasses any and all embodiments within the scope of the following claims.

The present disclosure relates to subject matter contained in Japanese Utility Model Application No. JP 9-346606 filed Dec. 16, 1997, and Japanese Utility Model Application No. JP 10-200772 filed Jul. 15, 1998, both of which are expressly incorporated herein by reference in their entirety.

What is claimed is:

1. A connector holder used with a wiring board during a wiring process of a connector, the wiring board having arranged thereon a cable having at least one wire, the cable to be connected with the connector during the wiring process, and protection material to be mounted about a connected cable during the wiring process, said connector holder being mountable on the wiring board and comprising:

a holder portion including a recess configured to hold a connector in an insertable and removable manner in a condition capable of connecting with the cable; and a positioning member connected to said holder portion and spaced from said recess, said positioning member positively positioning the protection material to be mounted about the cable connected with the connector at a location spaced from the connector.

2. The connector holder as set forth in claim 1, wherein said positioning member is adjustably fastened between said holder portion and a supporting pillar, thereby allowing the position of said positioning member to be adjusted to engage a cable connected with the connector.

3. The connector holder as set forth in claim 2 wherein said positioning member is a pin which allows positioning of the protection material arranged about a cable, such that at least two wires of the cable connected to the connector are arranged on opposite sides of said positioning member.

4. The connector holder as set forth in claim 2 further comprising:

a connector regulating member integral with said holder portion, wherein said connector regulating member positions a side of the connector where a cable is inserted therein in such a condition that the cable connected with the connector is disengageable, said connector regulating member comprising:

a resilient member which resiliently presses the connector against the connector regulating member, and a base portion affixed to said connector regulating member.

5. The connector holder as set forth in claim 4 wherein said resilient member has a pressing portion substantially parallel to said connector regulating member, the distance between said pressing portion and said connector regulating member being adjustable.

6. The connector holder as set forth in claim 4 wherein said connector regulating member has a front end face and a back face defining a facing interval therebetween.

7. The connector holder as set forth in claim 6 wherein said facing interval between said front end face and said back face is adjustable.

8. The connector holder as set forth in claim 1 wherein said positioning member is a pin which allows positioning of the protection material arranged about a cable, such that at least two wires of the cable connected to the connector are arranged on opposite sides of said positioning member.

9. The connector holder as set forth in claim 8 further comprising:

a connector regulating member integral with said holder portion, wherein said connector regulating member positions a side of the connector where a cable is inserted therein in such a condition that the cable connected with the connector is disengageable, said connector regulating member comprising:

a resilient member which resiliently presses the connector against the connector regulating member, and a base portion affixed to said connector regulating member.

10. The connector holder as set forth in claim 9 wherein said resilient member has a pressing portion substantially parallel to said connector regulating member, the distance between said pressing portion and said connector regulating member being adjustable.

11. The connector holder as set forth in claim 9 wherein said connector regulating member has a front end face and a back face defining a facing interval therebetween.

12. The connector holder as set forth in claim 11 wherein said facing interval between said front end face and said back face is adjustable.

13. The connector holder as set forth in claim 1 further comprising:

a connector regulating member integral with said holder portion, wherein said connector regulating member positions a side of the connector where a cable is inserted therein in such a condition that the cable connected with the connector is disengageable, said connector regulating member comprising:

a resilient member which resiliently presses the connector against the connector regulating member, and a base portion affixed to said connector regulating member.

14. The connector holder as set forth in claim 13 wherein said resilient member has a pressing portion substantially parallel to said connector regulating member, the distance between said pressing portion and said connector regulating member being adjustable.

15. The connector holder as set forth in claim 13 wherein said connector regulating member has a front end face and a back face defining a facing interval therebetween.

16. The connector holder as set forth in claim 15 wherein said facing interval between said front end face and said back face is adjustable.

17. A connector holder, wherein a connector is used with a wiring board during a wiring process of the connector, the wiring board having arranged thereon a cable having at least one wire, the cable to be connected with the connector during the wiring process, and protection material to be mounted about a connected cable during the wiring process, the connector holder being mountable on the wiring board and comprising:

a holder portion adapted to hold a connector in an insertable and removable manner in a condition capable of connecting with the cable; and a positioning member connected to said holder portion, said positioning member allowing positioning of the protection material to be mounted about the cable connected with the connector, and wherein said positioning member is a pin which allows positioning of the protection material arranged about a cable, such that at least two wires connected to the connector are arranged on opposite sides of said positioning member.

18. The connector holder as set forth in claim 17 further comprising:

a connector regulating member integral to said holder portion, wherein said connector regulating member positions a side of the connector where a cable is inserted therein in such a condition that the cable connected with the connector is disengageable;

a resilient member which resiliently presses the connector against the connector regulating member, and a base portion affixed to said connector regulating member.

19. The connector holder as set forth in claim 18, wherein said resilient member has a pressing portion substantially parallel to said connector regulating member, the distance between said pressing portion and said connector regulating member being adjustable.

20. The connector holder as set forth in claim 18, wherein said connector regulating member has a front end face and a back face defining a facing interval therebetween.

21. The connector holder as set forth in claim 20, wherein said facing interval between said front end face and said back face is adjustable.

22. A connector holder, wherein a connector is used with a wiring board during a wiring process of the connector, the wiring board having arranged thereon a cable having at least one wire, the cable to be connected with the connector during the wiring process, and protection material to be mounted about a connected cable during the wiring process, the connector holder being mountable on the wiring board and comprising:

a holder portion adapted to hold a connector in an insertable and removable manner in a condition capable of connecting with the cable;

a positioning member connected to said holder portion, said positioning member allowing positioning of the protection material to be mounted about the cable connected with the connector; and a connector regulating member integral with said holder portion, wherein said connector regulating member positions a side of the connector where a cable is inserted therein in such a condition that the cable connected with the connector is disengageable, wherein said connector regulating member has a front end face and a back face defining a facing interval therebetween, and said facing interval between said front end face and said back face is adjustable;

a resilient member which resiliently presses the connector against the connector regulating member, and a base portion affixed to said connector regulating member.

* * * * *